Figure 1:
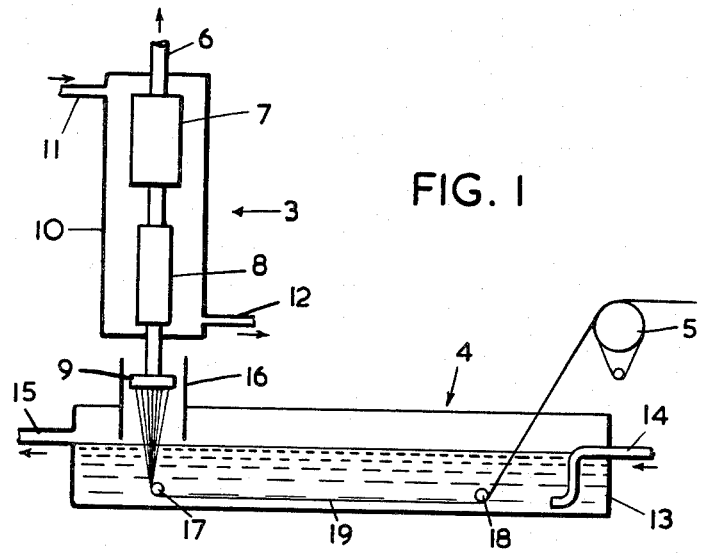

June 13, 1961 D. FINLAYSON ET AL 2,988,418
MANUFACTURE OF ARTIFICIAL FILAMENTS, FILMS
AND LIKE SHAPED ARTICLES OF
CELLULOSE TRIACETATE
Filed Sept. 29, 1955

D. FINLAYSON
B. KRZESINSKI
INVENTORS

ATTORNEYS

2,988,418
MANUFACTURE OF ARTIFICIAL FILAMENTS, FILMS AND LIKE SHAPED ARTICLES OF CELLULOSE TRIACETATE

Donald Finlayson and Boleslaw Krzesinski, Spondon, near Derby, England, assignors to British Celanese Limited, a corporation of Great Britain
Filed Sept. 29, 1955, Ser. No. 537,390
Claims priority, application Great Britain Oct. 13, 1954
12 Claims. (Cl. 18—54)

This invention relates to the manufacture of artificial filaments, films and like shaped articles, that is to say of artificial filamentary materials such as filaments, bristles, yarns, straws and the like and of films, foils and the like. It is particularly concerned with the manufacture of shaped articles having a basis of a cellulose acetate of acetyl value (reckoned as acetic acid) about 59% or higher, hereinafter referred to as a cellulose triacetate. Preferably the cellulose triacetate has an acetyl value above 61%.

According to the invention, filaments, films and like shaped articles are made by shaping a composition comprising a cellulose triacetate dissolved in or gelled with cyclohexanone at a temperature above 50° C. and preferably above 70° C., cooling the shaped composition to a temperature below 50° C. and preferably below 40° C., and simultaneously or subsequently removing the cyclohexanone from the resulting shaped article.

An important embodiment of the invention is the manufacture of filamentary materials by extruding the heated composition through orifices of circular or other desired shape into a setting zone maintained at a temperature below 50° C. and preferably below 40° C., and washing the cyclohexanone from the materials either in the setting zone or subsequently. For the sake of brevity the invention will be further described with particular reference to processes of this kind. It will however be understood that other methods of shaping the composition may be used, e.g. casting when films or foils are to be made, and that the cyclohexanone may be removed from the shaped articles otherwise than by washing.

The composition to be extruded preferably contains 12% or more of cellulose triacetate, and may be made by dissolving the cellulose triacetate in the cyclohexanone at a temperature near the boiling point, e.g. at about 150°–155° C. for the commercial product, or, if it is convenient to employ a small degree of pressure, at a slightly higher temperature, e.g. a temperature up to about 160° or 165° C. At these temperatures solutions of the cellulose triacetate of concentration up to about 15%–20% can be obtained, the maximum concentration obtainable depending to some extent on the precise composition and viscosity of the cellulose triacetate and the time of heating. Though the solubility of cellulose triacetate in cyclohexanone falls off fairly quickly on cooling, a gel is formed which remains capable of some degree of flow even at temperatures down to about 50° C. Thus the composition to be extruded may be regarded as either a solution or a gel or perhaps a mixture of the two, its precise nature varying with the temperature at which the extrusion takes place.

In the setting zone the extruded cellulose triacetate-cyclohexanone composition comes into contact with one or more cooling media, which may be either gaseous or liquid, and are advantageously at a temperature below 30° C. and especially between 10° and 25° C. In addition the filamentary or other material so formed may be caused to travel in contact with a solid surface at a similar temperature. For instance filamentary material may make one or more turns round a hollow driven or free running roller through which flows a cooling liquid such as cold water; such a roller may for example be mounted in a setting zone containing air at a temperature below 50° C., preferably below 30° C.

While the setting of the extruded filamentary material is caused primarily by the fall in the temperature of the material as it leaves the extrusion orifice or orifices, the effect of cooling may with advantage be supplemented by the simultaneous removal of part or the whole of the cyclohexanone. Thus the composition comprising cellulose triacetate and cyclohexanone may be extruded into a liquid which is miscible with cyclohexanone but is a non-solvent for cellulose triacetate, and especially into an aliphatic alcohol containing up to 5 carbon atoms in the molecule, hereinafter referred to as a lower aliphatic alcohol, or into a liquid hydrocarbon. Examples of such alcohols and hydrocarbons which may be used with good results are methyl, ethyl, isopropyl, t-butyl and amyl alcohols, and benzene, toluene, cyclohexane and petroleum ether of boiling range 60°–80° C. In view of the necessary difference in temperature between the spinning jet and the liquid, it will often be convenient to have a small air gap, for example a gap of between about ¼ and 2 inches, between the face of the spinning jet and the surface of the liquid. In the immediate vicinity of the spinning jet the air will of course become warm or hot, but otherwise it is kept at a temperature below 50° C., and especially below 30° C. While in this method of working the filamentary material will be cooled to some extent in the air gap, the gap is not sufficiently long to cool it completely, so that the filaments enter the liquid while they are still more or less soft and thus before they are fully set. The gap may if desired contain a gas other than air, for instance nitrogen or carbon dioxide.

In another method of working, the composition is extruded into a gaseous or liquid medium which serves only or mainly to cool it to a temperature at which the filamentary material is set, and the material is subsequently treated to remove from it its content of cyclohexanone. Advantageously it may be washed free from cyclohexanone continuously or batch-wise, preferably with a lower aliphatic alcohol or a liquid hydrocarbon. Thus the composition may be extruded into water (preferably containing a surface tension-reducing agent such as Turkey red oil) or into air, and the filamentary material so obtained subsequently washed; when the composition is extruded into a liquid, a gap may be provided between the surface of the liquid and the face of the spinning jet as described above.

The removal of cyclohexanone may if desired be effected by heating instead of washing the material, and especially by heating the material to about 140°–160° C. for a short time. This method however involves some risk of causing mutual adhesion between the filaments of a multi-filament yarn, and although the risk of such mutual adhesion may be reduced by heating the material to a lower temperature under vacuum, the method is most suitable for treating single filaments, e.g. bristles, and films and the like; it also finds a use in the production of composite single filaments by interfusion between a number of finer filaments.

The means employed for extruding the composition depend to some extent on its consistency, which in turn varies with the temperature. At temperatures above 75° C. and especially above 100° C. the composition may be fed to a heated spinning jet at a constant rate by means of a heated metering pump, such as a gear wheel pump, for example as in known processes for melt-spinning high linear polymers such as nylon. In another method the composition may be forced through a heated spinning jet by means of a screw press or a piston or like device or by liquid or gaseous pressure without employing a metering gear wheel pump. In yet another method, a rod or a column of tablets of the composition at a relatively low temperature may be pressed against a spinning jet which is heated, preferably above 75° C. and especially to 100° C. or higher, and the filaments so formed drawn away from the orifices of the jet.

In all these methods the filamentary material is preferably drawn from the spinning jet under a tension sufficient to stretch it by at least twice, and especially by about 3–10 times, its length as extruded. Thus the material may be drawn from the spinning jet and through a gaseous or liquid cooling medium by means of a godet or a winding device or by other similar means; for example it may, before it is fully set, be caused to pass round a cooled godet or the like which supplements the cooling section of a gaseous or liquid medium. Alternatively, especially when the composition is extruded into a gaseous cooling medium, the filamentary material may fall vertically through a path long enough for the weight of the material to impart the desired degree of tension.

Extrusion of the cellulose triacetate-cyclohexanone composition without the application of any substantial degree of tension to the filamentary material formed is however quite possible, and gives products which have properties which are of considerable interest for some purposes. Generally speaking, filamentary materials so made are characterised by a high extensibility and also by the possession of a very considerable degree of crimp. For example, when filaments, especially filaments of denier about about 10 or 20, are extruded into a cooling liquid (if desired via an air gap) and are allowed to lie in the liquid for a short time before being removed, they will generally have a high degree of crimp and an extensibility above 30% and often above 40%. Similar results are obtained whether the filaments are extruded into a solvent for cyclohexanone so that the cyclohexanone is washed out simultaneously with the setting of the filaments, or the cyclohexanone is removed from the filaments in a later operation.

Figure 2:
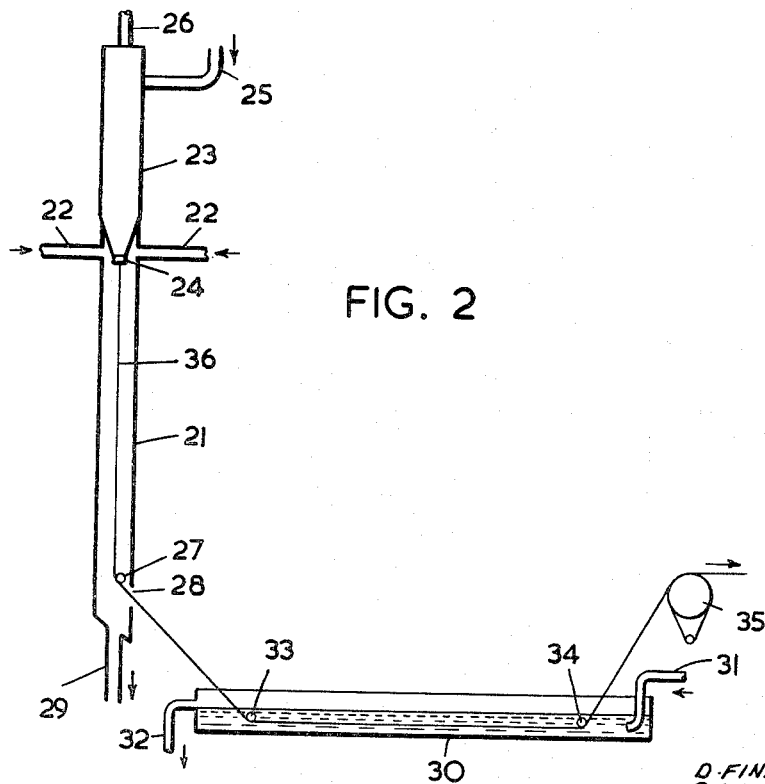

Apparatus by means of which the process of the invention can be carried out is illustrated in the accompanying drawing, in which:

FIGURE 1 represents diagrammatically and in section a device in which the filaments formed are simultaneously cooled and treated to remove the cyclohexanone, and FIGURE 2 represents diagrammatically and partly in section a device in which a thick filament or bristle is formed using only a gaseous cooling medium, and is subsequently treated to remove cyclohexanone.

Referring now to the drawing, the device illustrated in FIGURE 1 comprises a spinning head 3, a cooling and washing section 4 and a godet 5 adapted to draw filamentary material from the cooling and washing section 4 and to forward it for taking-up or any further treatment which it is to be given.

The spinning head 3 comprises a feed line 6 for the spinning composition, leading to a metering pump 7 of the gear wheel type which serves to forward the composition through a filter 8 to a spinning jet 9. A jacket 10 with inlet 11 and outlet 12 for a heating fluid surrounds the metering pump and filter, and the spinning jet 9 incorporates an electric resistance heating element (not shown).

The cooling and washing section 4 comprises a trough 13 for a cooling and washing liquid, one end of the said trough being just below the spinning jet 9. A liquid feed pipe 14 at the end of the trough 13 remote from the spinning jet 9 serves to introduce liquid into the bottom of the trough at that end, and an outlet 15 is situated at the other end of the trough at a level such that under operating conditions the surface of the liquid in the trough will be between 1 and 2 inches below the spinning jet 9. A draught shield 16 extends downwardly from a level slightly above the spinning jet 9 nearly to the surface of the liquid in the trough 13, and surrounds the spinning jet. A guide pin 17 is fixed near the bottom of the trough 13 below the spinning jet, and a second guide pin 18 is fixed at about the same level near the other end of the trough.

In operation the metering pump 7 and filter 8 and the spinning jet 9 are maintained at the temperature at which the spinning composition is to be extruded, and the composition is fed to the pump 7 through the feed line 6 and thence through the filter 8 to the spinning jet 9. It issues from the spinning jet in a number of filaments, which are partly set by cooling in the gap between the spinning jet 9 and the surface of the liquid in the trough 13. The filaments are passed under the guide pins 17 and 18, and in their passage through the trough 13 they come together to form a bundle or yarn 19. The yarn 19 is drawn from the trough 13 by means of the godet 5 and forwarded to a take-up means of any desired type or to a further treating device.

The form of apparatus illustrated in FIGURE 2 comprises a vertical setting cell 21 with inlets 22 near its upper end through which a supply of cooled air can be introduced into the cell. Above the cell and coaxial with it is a jacketed screw press 23 feeding to a die 24 having a single circular orifice of diameter for example about 0.035 inch. A feed line 25 for the spinning composition enters the screw press at its input end and the screw is driven through a shaft 26.

A guide pin 27 extends across the setting cell 21 towards its lower end, and at a slightly lower level an opening 28 is provided in the wall of the cell. At its lower end the cell opens into an exhaust line 29 through which air which has passed through the cell can be drawn off.

A narrow trough 30 is positioned with one end close to and at a level below that of the opening 28. An inlet 31 for a washing liquid is provided at that end of the trough which is remote from the opening 28, and an outlet 32 is provided at the other end and at a level such that a suitable depth of washing liquid can be maintained in the trough. The trough is provided with guide pins 33 and 34 towards its input and output ends respectively, the said guide pins being spaced from the bottom of the trough but well below the level of the surface of liquid in the trough under operating conditions. A godet 35 serves to draw filamentary material under the guide pin 34 and out of the trough 30, and to forward it to a drier (not shown).

In operation a heating fluid is passed through the jacket of the screw press, and a hot cellulose triacetate-cyclohexanone composition is fed through the feed line 25 into the screw press, by means of which it is extruded as a single filament or bristle 36 through the die 24. The composition is set by means of the cooled air passing through the cell 21, and the bristle 36 passes round the guide pin 27, out through the opening 28, under the guide pins 33 and 34 in the trough 30, and thence to the godet 35 and drier. The rate of travel of the bristle is so correlated with the rate of flow of the washing liquid through the trough, and with the length of the trough between the guide pins 33 and 34, that when the bristle leaves the bath it is free from or contains only a small proportion of cyclohexanone.

The device illustrated in FIGURE 1 or 2 may be modified by replacing the spinning head 3, or the screw press 23 and the die 24, by an extruding head in which a rod or a column of tablets of the cellulose triacetate-cyclohexanone composition is pressed against a heated spinning jet containing one or more orifices.

The invention is further illustrated by the following examples.

*Example I*

Cellulose triacetate was dissolved in boiling commercial cyclohexanone to give a 15% solution; this was formed hot into rods of diameter 9 mm., and the rods solidified by cooling. The solid rods were pressed against the internal face of a spinning jet containing a single orifice of diameter 0.035 inch and heated to 100°–110° C., and the filament so formed was drawn first through a short air gap and then through a bath containing isopropanol at 20° C., by a godet having a peripheral speed 8–10 times the linear speed of extrusion. In the bath the filament was rendered substantially free from cyclohexanone. The filament was then dried at a temperature of 70°–80° C. The dried filament had a tenacity of 1.05 grams per denier and an extensibility of 21%.

*Example II*

Cellulose triacetate was dissolved in boiling commercial cyclohexanone to give a 15% solution, which was then cooled to 100°–110° C. and fed by means of a gear wheel pump to a spinning jet maintained at the same temperature. The filaments produced were drawn through a short air gap of about 1 inch and then through a bath of isopropanol at 20° C., and were then dried as described in Example I.

*Example III*

A 15% solution of cellulose triacetate in cyclohexanone was cooled to 75–90° C. and the resulting gel was extruded through an orifice by means of a screw press. The filament produced was allowed to fall through a setting cell about 10 feet long, down which a current of air at about 20° C. was drawn continuously. After leaving the bottom of the setting cell the filament wast continuously washed with isopropanol until free from cyclohexanone, and was then dried.

*Example IV*

A gel obtained by cooling a 15% solution of cellulose triacetate in cyclohexanone to 120°–125° C. was forced at this temperature by means of an applied nitrogen pressure of 200 lb./sq. in. through a spinning jet at 120° C. containing a small number of orifices. The extruded filaments fell freely through a short air gap into a bath of isopropanol, on the bottom of which they rested for a few seconds before being withdrawn. The product was characterised by having an average extensibility of 43% and a high degree of spiral crimp.

In all these examples similar results were obtained when benzene or cyclohexane was used in place of isopropanol.

Having described our invention, what we desire to secure by Letters Patent is:

1. Process for the manufacture of shaped articles, which comprises dissolving cellulose triacetate in cyclohexanone at a temperature near the boiling point to form a solution containing 12 to 20 percent by weight of cellulose triacetate, shaping the composition so obtained at a temperature above 50° C., cooling the shaped composition to a temperature below 40° C. and removing cyclohexanone from the resulting shaped article.

2. Process for the manufacture of shaped articles extended in no more than two dimensions, which comprises dissolving cellulose triacetate in cyclohexanone at a temperature near the boiling point to form a solution of cellulose triacetate content 12–20%, shaping the composition so obtained to a form which is extended in no more than two dimensions at a temperature above 50° C., cooling the shaped composition to a temperature below 40° C. and removing cyclohexanone from the resulting shaped article.

3. A process as claimed in claim 2 wherein said shaped article is a film.

4. A process as claimed in claim 8 wherein said cooling step comprises passing the filaments obtained from the spinning jet first through a gas at a mean temperature below 50° C. for a short distance, and then through a liquid medium maintained at a temperature below 30° C. while they are drawn out by at least twice their length as extruded.

5. Process according to claim 4, wherein the liquid medium is water.

6. Process according to claim 4, wherein the liquid medium is a solvent for cyclohexanone.

7. A process for the manufacture of filaments of cellulose triacetate which comprises dissolving cellulose triacetate in cyclohexanone at a temperature above 50° C. to form a solution containing 12 to 20 percent by weight of cellulose triacetate, extruding the solution so obtained through a spinning jet at a temperautre above 50° C., immediately colling the extruded solution to a temperature below 40° C. to set the extruded filaments and removing cyclohexanone from the resulting filaments.

8. A process for the manufacture of filaments of cellulose triacetate which comprises dissolving cellulose triacetate in cyclohexanone at a temperature near the boiling point to form a solution containing 12 to 20 percent by weight of cellulose triacetate, extruding the solution so obtained through a spinning jet at a temperature above 50° C. immediately cooling the extruded solution to a temperature below 40° C. to set the extruded filaments and removing cyclohexanone from the resultant filaments.

9. A process for the manufacture of filaments of cellulose triacetate which comprises dissolving cellulose triacetate in cyclohexanone at a temperature near the boiling point to form a solution containing 12 to 20 percent by weight of cellulose triacetate, extruding the solution so obtained through a spinning jet at a temperature above 50° C. immediately cooling the extruded solution to a temperature below 40° C. to set the extruded filaments and washing the set filaments with a solvent for cyclohexanone whereby the cyclohexanone is removed from the filaments.

10. A process as claimed in claim 8 wherein the solvent used to remove the cyclohexanone is an aliphatic alcohol containing up to 5 carbon atoms in the molecule.

11. A process as claimed in claim 8 wherein the solvent used to remove the cyclohexanone is a liquid hydrocarbon.

12. A process as claimed in claim 8 wherein said filaments are cooled by means of a liquid medium into which they are passed without applied tension, whereby a crimped product of high extensibility is obtained.

References Cited in the file of this patent

UNITED STATES PATENTS

| | | |
|---|---|---|
| 190,865 | Jacob | May 15, 1877 |
| 1,339,728 | Tyrer | May 11, 1920 |
| 2,157,334 | Haines | May 9, 1939 |
| 2,318,679 | Dreyfus | May 11, 1943 |
| 2,323,383 | Dreyfus | July 6, 1943 |
| 2,354,745 | Dreyfus | Aug. 1, 1944 |
| 2,367,493 | Fordyce | Jan. 16, 1945 |
| 2,369,506 | Weibel | Feb. 13, 1945 |
| 2,518,753 | Charch | Aug. 15, 1950 |
| 2,687,944 | Johnson | Aug. 31, 1954 |
| 2,693,004 | Iwamae | Nov. 2, 1954 |
| 2,702,230 | Olmer | Feb. 15, 1955 |
| 2,707,306 | Weber | May 3, 1955 |

OTHER REFERENCES

Jordan: Technology of Solvents, page 247, 2nd edition, December 1940. (Copy in Div. 15.)

Doolittle: "The Technology of Solvents and Plasticizers" (1954), pages 452–455. (Copy in Scientific Library.)

Knowenagel: "Zeitschrift für Angewandte Chemie," vol. 27, No. I (1914), page 506.